Figure 1:
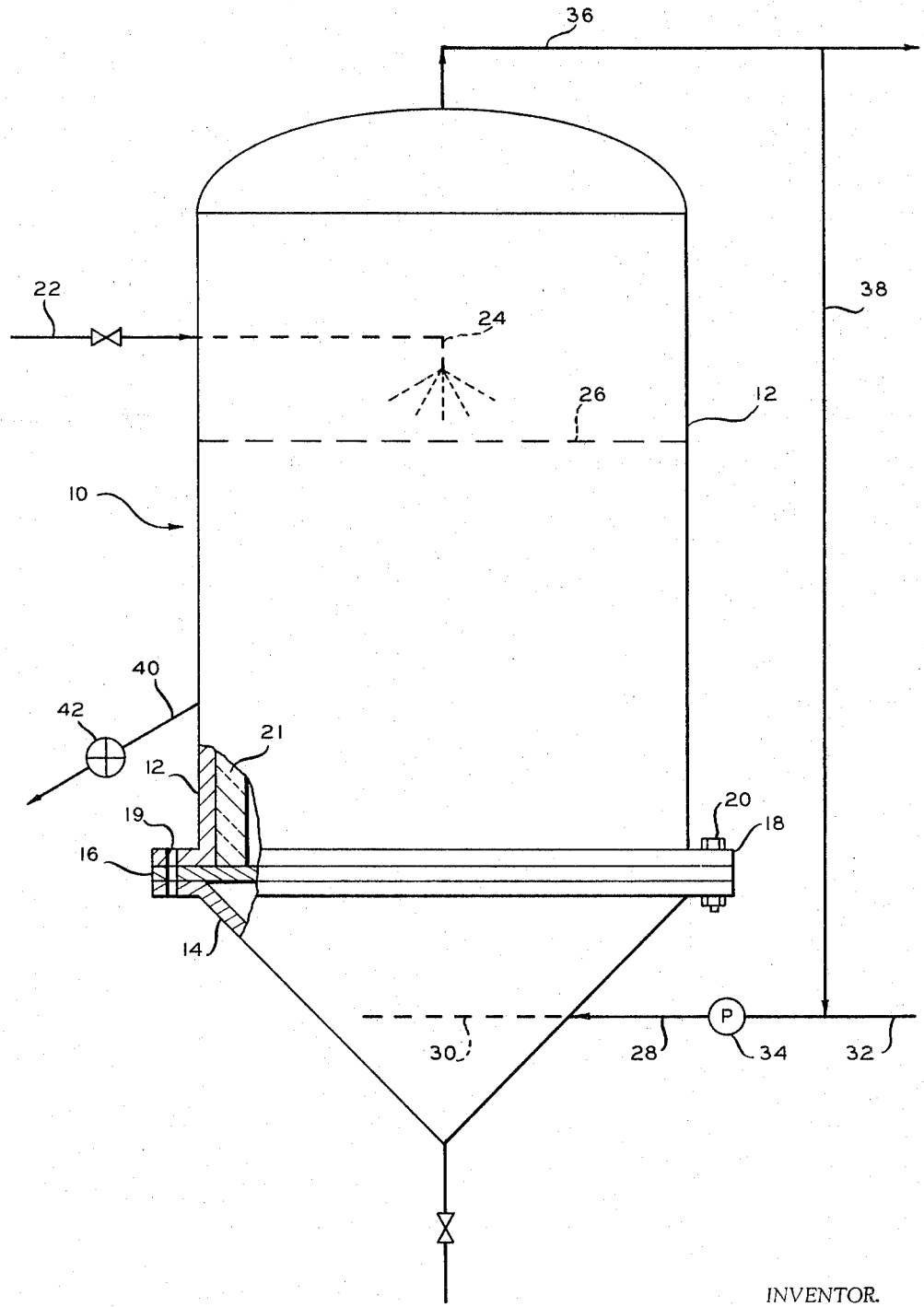

INVENTOR.
D. S. JOY
BY Young & Quigg
ATTORNEYS

United States Patent Office 3,295,221
Patented Jan. 3, 1967

3,295,221
PROCESS AND APPARATUS FOR FLUIDIZED
BED DRYING
David S. Joy, Bartlesville, Okla., assignor to Phillips
Petroleum Company, a corporation of Delaware
Filed June 24, 1964, Ser. No. 377,693
9 Claims. (Cl. 34—10)

This invention relates to a process and apparatus for fluidized bed drying of thermoplastic resins and other particulate materials requiring temperature control. A specific aspect of the invention pertains to an improved gas distribution plate for use in fluidized bed dryers.

In the fluidized bed drying of various types of particulate solids, hot gases, such as air, steam, flue gas, and various hydrocarbon gases, are passed upwardly thru a distribution plate into a bed of the fluidized material being dried. The hot gases quickly transfer heat to the solid particles thereby vaporizing the volatiles in the solid material. The temperature in the fluidized bed is essentially isothermal and depends on the inlet gas temperature, the solids feed rate, and the amount of volatiles in the wet solids.

The capacity of the dryer is dependent upon the fluidization velocity and temperature difference between the fluidization gas and the solid particles in the bed. As either of these variables is increased, the dryer capacity is increased. However, the fluidization gases transfer heat to the distribution plate, eventually heating this plate to approximately the fluidizing gas temperature. Since there are some spots on the distribution plate where solids may rest, at least momentarily, the distribution plate temperature cannot exceed the melting temperature or the decomposition temperature of the solid material being dried.

In the drying of thermoplastic resins as disclosed in the U.S. patent of Hawkins et al. No. 2,949,447, the drying efficiency is restricted by the maximum gas temperature that may be utilized without heating the grid or gas distributor plate to a temperature substantially that of the softening point of the resin. This invention is concerned with an improvement in a gas distributor plate for fluidized bed drying which permits higher maximum fluidizing gas temperature and increases the efficiency of the apparatus and drying process.

Accordingly, it is an object of the invention to provide an improved gas distributor plate for use in a fluidized bed dryer. Another object is to provide an improved fluidized bed dryer. A further object is to provide an improved fluidized bed drying process which increases drying efficiency of thermoplastic materials. Other objects of the invention will become apparent to one skilled in the art upon consideration of the accompanying disclosure.

A broad aspect of the invention comprises an improvement in a fluidized bed drying process in which a fluidized bed of the particualte material being dried is maintained in an enclosed drying zone by passing a hot fluidizing and drying gas upwardly thru a perforate metal gas distributor plate, resin containing liquid diluent is introduced to the bed, and dried resin is withdrawn from the bed wherein drying time is substantially dependent upon inlet gas temperature and maximum gas temperature is limited because of heating of the distributor plate to the softening point of the resin which results in the formation of a large soft sticky mass of polymer forming above the plate; the improvement comprising circulating coolant thru the distributor plate intermediate the perforations therein so as to maintain the top surface of the plate substantially below incipient fusion temperature of the resin so as to permit a higher inlet gas temperature; and increasing inlet gas temperature substantially above the maximum permitted temperature without cooling of the distributor plate.

In one embodiment of the invention, the heat exchange rate between the gas passing thru the peripheral walls of the perforations to the coolant is reduced by insulating the walls of the perforations. This reduces the heat loss of the gas to the coolant while maintaining the top surface of the gas distributor plate substantially below the softening temperature of the resin and increases the efficiency of the process and apparatus.

The gas distributor plate of the invention comprises a relatively thick metal plate rather uniformly perforated with spaced-apart rows of small holes and provided with conduits for coolant extending substantially along the center line between rows of holes substantially parallel with the upper and lower faces of the plate, these conduits for coolant being connected at their ends with conduit means for introducing and withdrawing fluid coolant. A refinement of the plate utilizes a refractory insulating material on the bottom surface thereof having holes therethru corresponding to the holes in the plate and refractory insulating inserts in the holes in the plate extending to within a short distance of the top of the plate.

Figure 2:
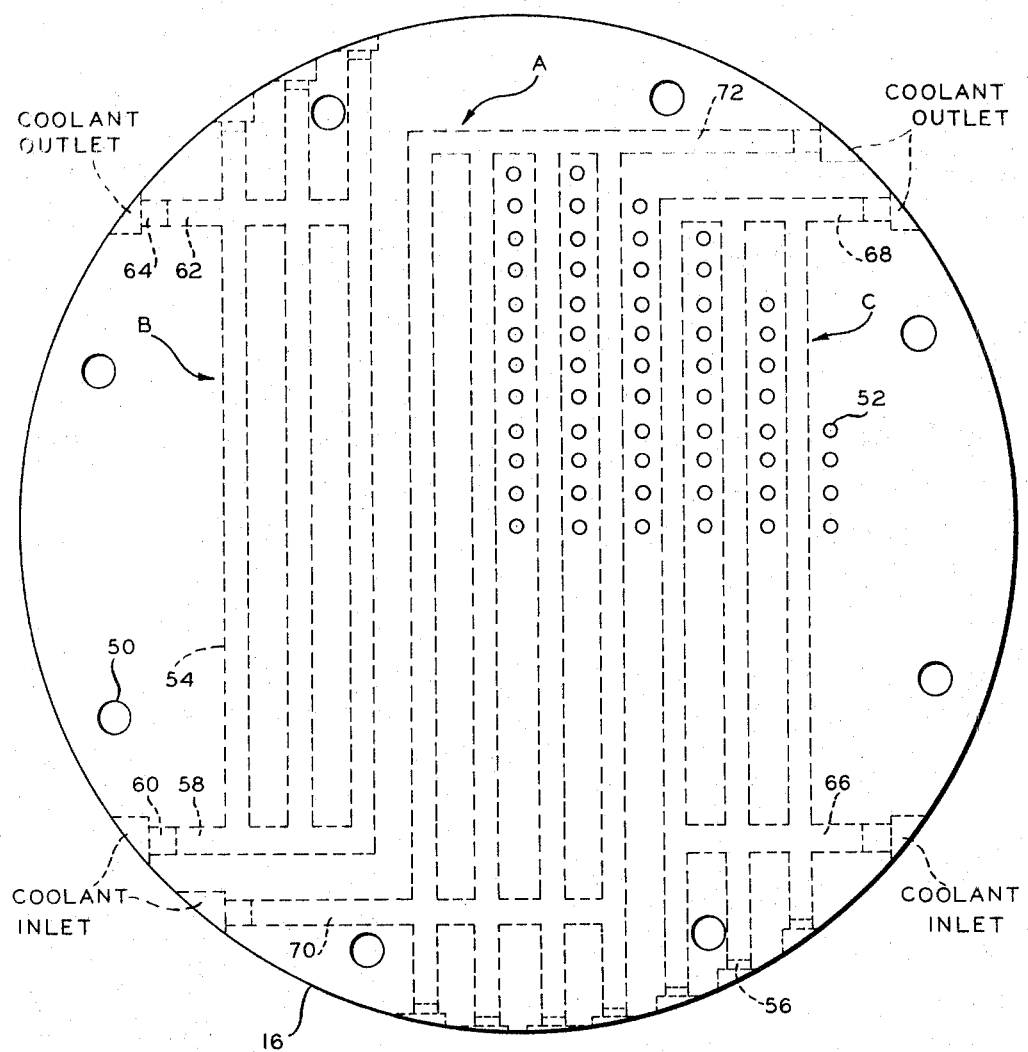

A more complete understanding of the invention may be had by reference to the accompanying schematic drawing of which FIGURE 1 is an elevation showing a fluidized bed dryer adapted for use of the invention; FIGURE 2 is a plan view of a preferred embodiment of the distributor plate and FIGURE 3 is a vertical cross section of the distributor plate of FIGURE 2.

Referring to FIGURE 1, a fluidized bed dryer 10 comprises an upright shell 12 closed at the top and having a conical bottom section 14. A gas distributor plate 16 is clamped between the flanges 18 by bolts 20 or other suitable clamping means. Line 22 leads from a source of polymer slurry (not shown) to a spray means 24 which serves to distribute the sprayed polymer in fluidized bed 26. Also, line 22 may be a means of adding a granular solid containing volatile material to the fluidized bed. Line 28 extends into conical section 14 and is perforated inside this section or connects with a gas distribution ring 30. Line 32 connects with a suitable source of hot fluidizing and drying gas (not shown) and with pump 34 which feeds the drying gas at a selected rate into the dryer. Gas flowing from bed 26, including the vaporized diluent introduced with the resin thru line 22, is withdrawn from the top of shell 12 thru line 36 and passed to recovery means, any suitable portion thereof being recycled thru line 38 to supplement the gas in line 32. If desired, a gas solids separator may be included in line 36 upstream of line 38 for recovering any polymer particles in the effluent gas and these may be passed to the drying zone by conduit means not shown. Dried particulate polymer is removed from bed 26 by any suitable withdrawal means such as conduit 40 which is provided with flow control means 42, such as a star valve.

The fluidized bed dryer designed by numeral 10 may also be constructed in the manner shown in the above-identified patent of Hawkins et al.

Figure 3:
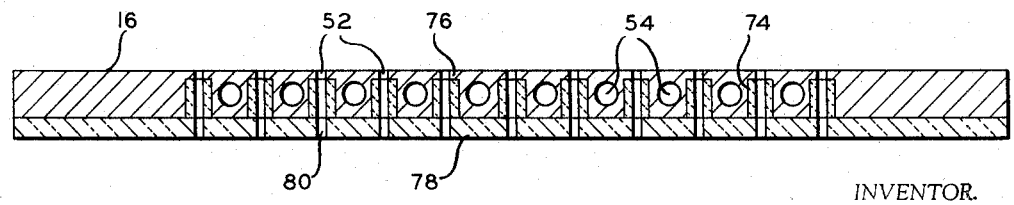

Referring to FIGURES 2 and 3, plate 16 is a metal plate drilled at regular intervals for bolt holes 50 which serve to attach the plate between the flanges of the shell and its bottom section. Rows of small holes (⅛" in diameter in the embodiment illustrated) designated 52 form a uniform distribution pattern within that portion of the dyer bonded by the inner walls of the dryer. It is to be understood that the shell 12 of the dryer is lined with insulating material and the radially outermost holes are adjacent the inner wall of the dryer. Coolant conduits 54 are drilled along the center line between rows of holes and substantially parallel with the faces of the plate. After drilling the various conduits, the open drilled hole at the edge of the plate is plugged by brazing as indicated at 56. The coolant conduits plan includes a center section A and outer sections B and C. The ends of the coolant conduits in section B are connected by a drilled hole or conduit 58, the outer end of which is provided with a connector 60 for a coolant feed line. The opposite ends of the coolant conduits for section B are similarly connected with a drilled hole or conduit 62 which is also provided with a connector 64 suitable for connecting to an effluent cooling line. Similarly the ends of the coolant conduits of section C are provided with inlet conduit 66 and outlet conduit 68. In a similar manner the ends of the coolant conduits of section A are provided with inlet conduit 70 and outlet conduit 72.

Referring to FIGURE 3 the holes 52 are provided with ceramic inserts 74 in the form of annular sleeves extending to within a short distance of the top surface of the plate, leaving a section 76, about 1/32 of an inch in thickness for efficient heat conduction with the coolant in conduits 54. These inserts fit drilled holes surrounding holes 52 and are held in place by insulating material 78 attached to the bottom of plate 16. The pattern of holes 80 in insulating material 78 corresponds identically with the pattern of holes 52 in plate 16. In one embodiment of the invention insulating material 78 is made of Transite 1/4" thick attached to a 3/4" thick aluminum distribution plate containing 1/8" holes. Rows of holes 52 were spaced on one inch centers and the holes in the rows were spaced at 1 1/2" intervals. Coolant conduits 54 were 3/8" drilled channels.

The invention is not limited to the specific materials disclosed herein. The insulating material 78 may be formed of any suitable refractory insulating material in addition to Transite and insulators 74 may likewise be formed of similar or different refractory insulating material. Also plate 16 may be fabricated of any refractory metal or alloy. Aluminum was selected because of its high thermal conductivity and its ease of drilling. It is also feasible to form the distributor plate by casing the metal or alloy around the metal tubing shaped into a pattern corresponding substantially with the pattern of coolant conduits illustrated in FIGURES 2 and 3 so as to provide a metal plate having the tubing imbedded therein. The imbedded tubing may comprise several sections with individual inlets and outlets for the various sections to provide more efficient cooling.

The apparatus, substantially as described herein, was utilized in drying a 0.935 density polyethylene made in accordance with the U.S. Patent of Hogan and Banks, No. 2,825,721. This polyethylene had a softening point of 215'–220° F. Without the improved gas distributor plate of this invention, fluidizing gas temperature was limited to 220° F. to prevent fusion on the distributor plate. The fluidized bed temperature had to be maintained at 175° F. to produce a product with less than 1 percent volatiles. Therefore, the ΔT for the transfer was 45° F.

Utilizing the water coolant distributor plate of the invention with coolant flowing therethru to maintain the temperature of the top surface of the plate below 200° F. a fluidizing gas in excess of 300° F. was used. Inlet gas temperature below the plate was 305° F. while maintaining the bed temperature at about 175° F. The upper surface of the distributor plate in contact with the fluidized bed was controlled at temperatures in the range of 160–180° F. The fluidizing gas cooled about 30° F. as it passed thru the distributor plate without utilizing insulated inserts in the holes in the plate and without insulation on the bottom thereof. This operation gave a true gas ΔT of the difference between 270 and 175° F. or 95° F. The plate even without the insulation on the bottom and in the walls of the holes increased the capacity of the dryer by approximately 90 percent. In the operation described, the inlet gas temperature could have been raised about 50° F. more but equipment limitations prevented this type of run.

It is calculated that the use of the insulating material on the bottom of the plate and in the holes thru the plate as shown in FIGURE 3 of the drawing will reduce the temperature drop of the gas thru the plate from about 30° F. in the illustrated operation to from 5 to 10° F. This will substantially increase the efficiency of the plate and the drying process.

The invention is applicable to the drying of various particulate materials which are temperature sensitive, i.e., which must be maintained below a given temperature level to prevent discoloring, decomposition, and/or undesired reaction. All of the various types of polymers and resins disclosed in the above-mentioned patent to Hawkins et al. are amenable to drying in the process and apparatus of this invention. In fact, any thermoplastic or thermosetting resin may be dried in the manner and with the apparatus disclosed herein. The various diluents and solvents utilized in the manufacture of polymers and resins may be fluidized in accordance with the invention. The fluidizing and drying gas may comprise any of these diluents, alone, or in admixture with other inert gases in the process. Under conditions wherein the drying or volatilization of the solvent from the resin slurry is suitably effected at temperatures substantially above 212° F., steam may be utilized as the fluidizing and drying gas or to supplement another relatively inert gas in the process. Various paraffin and cycloparaffin hydrocarbons of from 3–12 carbon atoms per molecule are frequently used as diluents in polymer and resin manufacture. In fact, any hydrocarbon which is relatively inert, non-deleterious, and liquid under the operation condition of the polymerization process may be fluidized and removed from the polymer in fluidized bed operation.

The inlet gas temperature to the dryer is controlled in the range of about 70 to 150° F. above the softening temperature of the resin being dried. Bed temperature is maintained substantially below, such as at least 25° F. below the softening temperature. In the foregoing illustration, bed temperature was maintained within ±1° F. by controlling the feed rate of polymer slurry to the bed in response to temperature therein. A bed temperature in the range of 25 to 75° F. below softening temperature is generally used. A bed temperature high enough to properly dry the resin is required and depends upon the solvent used.

Certain modifications of the invention will become apparent to those skilled in the art and the illustrative details disclosed are not to be construed as imposing unnecessary limitations on the invention.

I claim:
1. A process for drying particulate thermoplastic material containing liquid diluent comprising the steps of:
 (1) maintaining a fluidized bed of said material in a drying zone provided with a perforate one-piece metal plate immediately below said bed;
 (2) passing hot fluidizing and drying gas upwardly into said bed thru said plate to effect fluidizing and drying of said material;
 (3) introducing fresh said material to and withdrawing dried material from said bed;
 (4) providing the walls of the holes in said plate and the bottom surface of said plate with ceramic material to lower heat conduction thereto from said gas;
 (5) circulating a fluid coolant laterally thru conduits within said plate to extract heat therefrom so as to permit higher drying gas temperature than permissible without steps (4) and (5) and avoid incipient fusion of said material and sticking thereof to the upper surface of said plate which would normally occur;

(6) withdrawing drying gas from an upper section of the drying zone of step (1) above said bed; and (7) using higher drying gas temperature than could be used without steps (4) and (5).

2. The process of claim 1, wherein said material is a solid polymer of a 1-olefin.

3. The process of claim 1, wherein the temperature of the top surface of said plate is maintained in the range of about 10 to 100° F. below the softening point of the resin.

4. The process of claim 1 wherein bed temperature is maintained in the range of 25 to 75° F. below the softening temperature of said resin.

5. A gas distributor plate comprising:
(a) a one-piece flat metal plate perforated with rows of spaced-apart drilled holes normal to the plate face arranged in a substantially uniform pattern for flow of gas therethru;
(b) a series of conduits within said plate parallel with the face thereof, each of said conduits extending substantially along a center line between adjacent rows of said holes;
(c) conduit means in said plate connecting the ends of the conduits of (b) with inlets and outlets in the edges of said plate for circulating a fluid coolant thru said condiuts; and
(d) an annular ceramic insert of relatively low heat conductance forming at least the lower end of the periphery of each of the holes of (a) when said plate is in horizontal operating position.

6. Apparatus comprising in combination:
(a) an upright fluidized bed dryer having inlet means for a feed to be dried in an upper section, outlet means in an upper section for withdrawing dried material, and gas inlet means in a lower section;
(b) a gas distributor plate constructed in accordance with claim 2 above said gas inlet means and below said inlet means for feed and said outlet means; and
(c) separate means for circulating fluid coolant thru said perforate plate between the perforations therein.

7. The apparatus of claim 6 including a refractory ceramic insulated covering over the lower face of the distributor plate.

8. A gas distributor plate comprising:
(a) a flat metal plate perforated with rows of spaced-apart holes normal to the plate face arranged in a substantially uniform pattern for flow of gas therethru;
(b) a series of conduits within said plate parallel with the face thereof, each of said conduits extending substantially along a center line between adjacent rows of said holes;
(c) conduit means in said plate connecting the ends of the conduits of (b) with inlets and outlets in the edges of said plate for circulating a fluid coolant thru said conduits;
(d) a refractory ceramic annular insert forming the major portion of the periphery of each of the holes of (a) extending upwardly from the lower face of said plate (when in operating position); and
(e) a refractory ceramic insulating covering over the lower face of said plate having openings coinciding with the holes of (a).

9. Apparatus comprising in combination:
(a) an upright fluidized bed dryer having inlet means for a feed to be dried in an upper section, outlet means in an upper section for withdrawing dried material, and gas inlet means in a lower section;
(b) a gas distributor plate constructed in accordance with claim 8 above said gas inlet means and below said inlet means for feed and said outlet means; and
(c) separate means for circulating fluid coolant thru said perforate plate between the perforations therein.

References Cited by the Examiner
UNITED STATES PATENTS

| | | | |
|---|---|---|---|
| 940,244 | 11/1909 | Friedenthal | 165—164 |
| 2,789,034 | 4/1957 | Swaine et al. | |
| 3,016,624 | 1/1962 | Bliss | 34—57 |
| 3,057,701 | 10/1962 | Coates et al. | 23—284 |
| 3,212,197 | 10/1965 | Crawford | 34—10 |

FREDERICK L. MATTESON, Jr., *Primary Examiner.*

D. A. TAMBURRO, *Assistant Examiner.*